United States Patent [19]

Frank

[11] Patent Number: 4,459,878

[45] Date of Patent: Jul. 17, 1984

[54] CONTROL SYSTEM AND METHOD FOR A POWER DELIVERY SYSTEM HAVING A CONTINUOUSLY VARIABLE RATIO TRANSMISSION

[75] Inventor: Andrew A. Frank, Madison, Wis.

[73] Assignee: Aisin Seiki Kabushiki Kaisha, Kariya, Japan

[21] Appl. No.: 380,922

[22] Filed: May 21, 1982

[51] Int. Cl.$^3$ .................. B60K 41/12; B60K 41/18
[52] U.S. Cl. .................................. 74/857; 74/865; 74/866; 74/863; 74/877
[58] Field of Search ............... 74/857, 858, 865, 866, 74/863, 877, 752 D, 689; 474/18, 17, 28, 30

[56] References Cited

U.S. PATENT DOCUMENTS

| | | | |
|---|---|---|---|
| Re. 24,347 | 12/1960 | Miner | 74/230.17 |
| 2,059,591 | 11/1936 | Leoni | 74/857 X |
| 2,131,157 | 9/1938 | Almen et al. | 74/865 |
| 3,008,341 | 11/1961 | Cobb | 74/687 |
| 3,044,316 | 7/1962 | Forster | 74/865 |
| 3,256,747 | 6/1966 | Kempson | 74/865 |
| 3,368,426 | 2/1968 | Karig et al. | 74/865 |
| 3,552,232 | 1/1971 | Kress | 74/689 |
| 3,616,706 | 11/1971 | Shimamoto | 74/230.17 |
| 3,861,485 | 1/1975 | Busch | 74/869 X |
| 3,890,360 | 6/1975 | Pruvot et al. | 74/860 X |
| 4,008,567 | 2/1977 | Hirsch | 74/866 |
| 4,023,442 | 5/1977 | Woods et al. | 74/863 |
| 4,091,690 | 5/1978 | Miyao | 74/865 |
| 4,107,776 | 8/1978 | Beale | 74/866 |
| 4,152,947 | 5/1979 | Van Deursen et al. | 74/230.17 |
| 4,220,059 | 9/1980 | Mizuno et al. | 74/865 |
| 4,281,567 | 8/1981 | Manner | 74/859 X |
| 4,346,625 | 9/1982 | Latsch et al. | 74/866 X |

FOREIGN PATENT DOCUMENTS

| | | | |
|---|---|---|---|
| 1182150 | 6/1959 | France | 74/866 |
| 1592060 | 7/1981 | United Kingdom | 74/18 |

OTHER PUBLICATIONS

Stubbs, "The Development of a Perbury Traction Transmission for Motor Car Applications", *American Society of Mechanical Engineers*, (1980).

Ironside et al., "Continuously Variable Transmission Control", *Vehicular Technology Society IEEE*, (1980).

Beachley et al., "Principles and Definitions for Continuously Variable Transmissions, with Emphasis on Automotive Applications", *American Society of Mechanical Engineers*, (1980).

"Porsche Features Engine and Driveline Efficiency", *Automotive Engineering*, vol. 90, No. 1, Jan. 1982, pp. 38–48.

Rayward et al., "Design Study of Torodial Traction CVT for Electric Vehicles", (1980).

Oliver et al., "Design Equations for a Speed and Torque Controlled Variable Ratio V–Belt Transmission", *Society of Automobile Engineers*, (1973).

*Primary Examiner*—Allan D. Herrmann
*Assistant Examiner*—D. Wright
*Attorney, Agent, or Firm*—Banner, Birch, McKie & Beckett

[57] ABSTRACT

A control system and method for a power delivery system, such as in an automotive vehicle, having an engine coupled to a continuously variable ratio transmission (CVT). Totally independent control of engine and transmission enable the engine to precisely follow a desired operating characteristic, such as the ideal operating line for low fuel consumption. CVT ratio is controlled as a function of commanded desired system performance (e.g., power or torque) and measured actual system performance, such as CVT torque output, while engine fuel requirements (e.g., throttle position) are strictly a function of measured engine speed. Fuel requirements are therefore precisely adjusted in accordance with the ideal characteristics for any load placed on the engine. Appropriate controls prevent anomalous engine and vehicle behavior, and allow for transient start-up from rest.

67 Claims, 11 Drawing Figures

FIG. 1 ENGINE PERFORMANCE MAP

SHEAVE ACTUATING CURVES

CONTROL SYSTEM AND METHOD FOR A POWER DELIVERY SYSTEM HAVING A CONTINUOUSLY VARIABLE RATIO TRANSMISSION

BACKGROUND OF THE INVENTION

This invention relates to a power delivery system having a continuously variable ratio transmission and, more particularly, to a control system and a control method for such a system, such as might be used in an automotive vehicle.

The quest for greater fuel economy of automotive vehicles has led to significant improvements in engine and transmission design and control. Continuously variable ratio transmissions (CVT) have shown particular promise in this regard. It will be appreciated that at any given vehicle speed, and for any needed propulsive force, a certain transmission ratio will provide maximum fuel economy for a given engine. In addition, for any given vehicle speed, one transmission ratio will permit maximum acceleration with that engine. Since a CVT with the proper ratio range can provide any desired transmission ratio, it is obviously attractive for automobiles from the standpoint of economy, low emissions and performance. If the mechanical efficiency of the CVT is high and its ratio range is wide enough, it can even be possible to have both maximum economy and maximum performance in the same vehicle. Among the obvious benefits are fully automatic operation, smooth, stepless and rapid response to driver demand, and quieter cruising.

Many different CVT configurations have been developed in the prior art. These include, for example, hydrostatic transmissions; rolling contact traction drives; overrunning clutch designs; electrics; multi-speed gear boxes with slipping clutch; and V-belt traction drives. Of these the V-belt traction drives appear attractive for small to medium size passenger car applications because of their compactness, lightness and simplicity of design. Basically, this type of CVT comprises a V-belt which interconnects a driver sheave and driven sheave, the diameters of the sheaves being variable to change the ratio of the CVT. Recent advances in belt design have resulted in improved belt durability and longevity. If sheave movement can be properly controlled so as to avoid undue stresses on the belt, it is expected that a very long belt life can be achieved.

Many control schemes have been devised for engine-CVT systems in attempts to maximize fuel economy. These have been based on empirical analyses of individual engine performance, and the realization that, for any desired power output, there is an optimum combination of engine speed and torque which will result in minimum fuel consumption. This is illustrated in FIG. 1.

FIG. 1 is a typical performance map of a four cylinder spark ignition passenger car engine having a displacement of approximately 2.5 liters. The map is a plot of engine torque $T_E$ and brake horsepower BHP as a function of engine speed $N_E$. The dot-dash line near the top of the map is a plot of engine torque at full throttle. The series of curves in solid black lines are fuel consumption contours, indicating constant brake specific fuel consumption (BSFC) in lb.M/BHP-hr. Minimum fuel consumption occurs at a point designed by 0.4 pounds per horsepower-hour. The series of dashed lines indicates power output of the engine. The ideal operating line for low fuel consumption is indicated by the heavy solid line $f(N_E)$, this curve being a function of engine speed. The ideal operating line for low fuel consumption is purely a function of engine characteristics and is optimal regardless of vehicle road speed. Other ideal operating lines may appear on the performance map, for example, the ideal operating line for low emissions.

In a vehicle with a conventional, manually shifted gearbox, forward speed ratios usually are available in only four or five steps. The operating point of the engine on the performance map is determined by drive shaft speed, power or torque commanded, and transmission gear ratio. Since there are only a few gear ratios available in a typical transmission, the engine must be throttled much of the time. The engine must therefore operate most of the time at high BSFC values. In contrast, a CVT is able to vary its speed ratio continuously to allow the engine to run at wider throttle and lower BSFC values.

Perhaps the most difficult task demanded of a control system for an engine-CVT system is to maintain engine operation along the ideal operating line. This is due to the almost continuous transient nature of operation of an automotive vehicle, there being hardly ever a time when road load and commanded torque or power remain constant. Transient conditions usually are dealt with by a change in CVT ratio, engine speed and throttle. Prior art control systems, by their very nature, permit an excursion of engine operation away from the ideal operating line before returning back to it at steady state. An example of such an excursion is shown in FIG. 1 by dashed line X-Y-Z. The result is that engine operation approaches, but hardly ever is maintained on the ideal operating line. Two such prior art systems are illustrated in FIGS. 2 and 3.

FIG. 2 schematically illustrates a system devised by Peter Stubbs for British Leyland. This system is described in greater detail in Stubbs, *The Development of a Perbury Traction Transmission for Motor Car Applications*, ASME Publication No. 80-C2/DET-59 (August, 1980). In this system, engine speed, throttle position and CVT ratio signals are all fed to a computer controller which has, in its memory, the engine operating characteristic for minimum fuel consumption. The computer controller generates, as a function of these variables, engine control signal for adjusting the position of the throttle, and a ratio rate signal which changes the ratio of the CVT. The throttle is under the direct control of the vehicle accelerator pedal so that, while the engine control signal may vary the throttle position somewhat from that commanded by the driver, the throttle position still is primarily a function of commanded power or torque.

FIG. 3 is a schematic representation of the system devised by Miyao for Aisin Seiki. This system is described in greater detail in U.S. Pat. No. 4,091,690. Here, as in the Stubbs system, engine throttle is primarily a function of commanded power or torque by direct connection with the accelerator pedal. The computer generates a ratio rate signal to change the CVT ratio as a function of measured throttle position and engine torque and speed. Inherently sensed output torque also affects the CVT ratio.

In these, as well as in virtually all other engine-CVT control systems, throttle position is controlled directly by the vehicle accelerator pedal, or is a direct function of pedal position, as well as other parameters. Engine and transmission control usually are directly related to one another. Such control schemes permit engine operation during transients to vary from the ideal operating line. Excursions away from the ideal operating line result in less than optimum engine operation (e.g., excessive fuel consumption, or excessive emissions), until effective control is resumed by the system during steady state operation. As pointed out earlier, however, most vehicular operation is transient in nature, rather than steady state, so that substantially all engine operation occurs off the ideal operating line. Emissions calibrations must therefore be made in a substantial portion of the engine performance map. Most prior art control systems also must be specifically tailored to particular engines. This requires numerous specially designed control systems for a fleet of differently powered vehicles. In addition, most prior art control systems cannot compensate for varying engine conditions, the result being vehicle driveability which varies with engine temperature, state of tune, age and altitude. Close duplication of conventional vehicle characteristics also is a problem with prior art CVT control schemes.

SUMMARY OF THE INVENTION

It is therefore an object of the present invention to overcome the above-noted disadvantages and deficiencies of the prior art by providing an engine-CVT control scheme which substantially constantly maintains engine operation along the ideal operating line.

Another object of the invention is to provide such a control scheme which yields substantially constant vehicle driveability as sensed by the driver, irrespective of engine temperature, age, state of tune, altitude and other variables.

Another object of the invention is to provide such a control scheme in a vehicle whose characteristic will remain the same irrespective of the type of engine which is coupled to the CVT.

Another object of the invention is to provide such a control scheme in a CVT vehicle, which will enable the vehicle to perform almost in all respects as a vehicle with a conventional transmission.

Another object of the invention is to greatly simplify calibration of the engine for emissions purposes.

Surprisingly it has been found that engine operation can readily be maintained along the ideal operating line by providing for totally independent engine and transmission control. That is, the position of the engine throttle is totally independent of accelerator pedal position. Throttle position and, hence, engine output torque simply is a function of engine speed only, and that function may be any desired relationship, for example, the ideal operating line for low fuel consumption, the ideal operating line for low emissions, or a compromise ideal operating line for low fuel consumption and low emissions. Torque, power or other desired performance parameters commanded by the accelerator pedal controls CVT ratio, and engine speed is determined by the load placed thereon, which is a function of road load and CVT ratio. Hence, throttle position is precisely adjusted in accordance with the ideal function for any load placed on the engine. With appropriately designed controls, which also are a part of this invention, anomalous engine and vehicle behavior, such as engine overspeed and underspeed conditions, can be prevented, transient start-up from rest can be accommodated, and the vehicle can be made to perform almost in all respects just as a vehicle with a conventional automatic transmission.

For convenience, the invention is described throughout this specification in the context of an engine-CVT propulsion system for an automotive vehicle. It is to be understood, however, that the principles of the invention are equally applicable to any type of power delivery system, including but not limited to other vehicular systems using internal or external combustion engines of any design, or to stationary power plants for driving compressors, generators or any other type of machinery. Where the term "throttle" is used, the term is understood to encompass any mechanism for controlling the delivery of fuel to the engine or other prime mover, be it a conventional carbureted spark-ignition engine wherein fuel flow varies with throttle butterfly position, a fuel injected spark-ignition or diesel engine, a gas turbine, and so on.

The above and other objects of the invention are accomplished by providing a method of controlling the operation of a power delivery system including a prime mover and a continuously variable ratio transmission coupled to the prime mover for delivering power from the prime mover to an output shaft. The prime mover has fuel delivery means for delivering a variable quantity of fuel thereto, and the power delivery system is controlled by command means for commanding a desired system performance parameter, such as output power or torque delivered to the output shaft. The method includes the steps of measuring the actual performance of the system, and controlling the ratio of the transmission as a function of the commanded performance parameter and the measured actual performance of the system, the speed of the prime mover varying as a function of transmission ratio. A fuel function is predetermined which defines desired fuel requirements for the prime mover in relation to prime mover operating speed. The speed of the prime mover is measured, and the fuel delivery means is controlled in accordance with the fuel function so that the fuel delivered to the prime mover is determined only by the speed thereof. In vehicular applications, during stationary and relatively slow vehicle operation, the command means is temporarily operatively coupled to the fuel delivery means to provide positive driver control of the engine. The engine and transmission may be coupled by a clutch which is disengaged when the vehicle is stationary and is partially engaged during slow vehicle operation.

The invention also encompasses a system for carrying out the above-described method, and a power delivery system including the prime mover, transmission and control system therefor.

The invention also includes a method of controlling the operation of the engine of an engine-driven vehicle during stationary and relatively slow vehicle operation. The vehicle engine is coupled to a CVT and has command means for commanding a desired output power or torque delivered to the output shaft, the drive ratio of the transmission varying as a function of commanded power or torque to thereby cause the speed of the engine to vary. The method comprises the steps of predetermining a fuel function defining desired fuel requirements for the engine in relation to engine operating speed, measuring the speed of the engine, controlling the fuel delivery means only in accordance with the fuel function so that the fuel delivered to the engine is determined only by the speed thereof, and operatively coupling the command means to the fuel delivery means during stationary and relatively slow vehicle operation. This coupling is dependent upon comparison of a ratio signal, equal to the quotient of measured engine speed and measured output shaft speed, to a predetermined slow operation ratio, the command means being operatively coupled to the fuel delivery means when the ratio signal exceeds the slow operation ratio. A system for controlling the engine in accordance with this method also is included.

BRIEF DESCRIPTION OF THE DRAWINGS

The novel features of the invention are set with particularity in the appended claims, but the invention will be understood more fully and clearly from the following detailed description of the invention as set forth in the accompanying drawings, in which:

FIG. 7 primarily relates to the engine control circuit;

FIG. 8 primarily relates to the starting clutch control circuit;

FIG. 9 primarily relates to the sheave pressure generators;

FIG. 10 illustrates a modification of the pressure generator for the driven sheave illustrated in FIG. 9.

DETAILED DESCRIPTION

Figure 4:
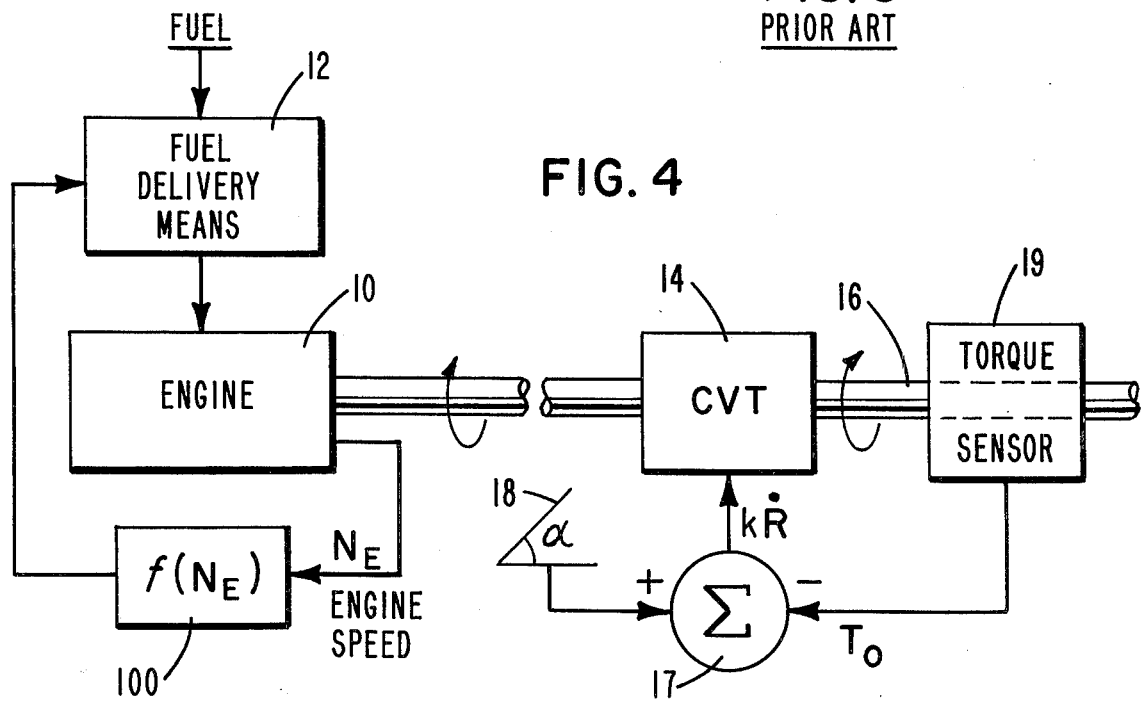
FIG. 4 is a schematic illustration showing the functional relationships of the components of an engine-CVT control scheme according to the invention.

FIG. 4 illustrates the functional relationships of the components of the invention. An engine 10 is drivingly coupled to a continuously variable ratio transmission (CVT) 14 through a clutch or fluid coupling (not shown). Fuel is fed to engine 10 by a fuel delivery means 12, which may be the throttle and fuel jets of a conventional carburetor, a fuel injection system or the like. CVT 14 may be one of the many types of continuously variable ratio transmissions discussed above in connection with the prior art. Output shaft 16 delivers power and torque from the engine and CVT. The ratio of the CVT is set by a CVT ratio controller 17, which generates a rate of change of ratio signal kR̈ as a function of output torque $T_O$ measured by torque sensor 19 and commanded power or torque α commanded by accelerator pedal 18. Other parameters indicative of engine-CVT system performance may be used by ratio controller 17 to effect a change of CVT ratio in a similar manner. For example, rather than using desired output power or torque and measured actual output torque, commanded and measured vehicle acceleration, output shaft accelerator, or other parameters could be used. In this preferred embodiment, however, CVT ratio is strictly a function of commanded power or torque and measured output torque, and is completely independent of engine operation. Engine control, on the other hand, is provided by an engine controller 100 which adjusts fuel delivery means 12 in accordance with measured engine speed $N_E$. This relationship may desirably be the ideal engine operating line for low fuel consumption, the ideal operating line for low emissions, a compromise of the two, or any other desired engine operating characteristic.

Figure 5:
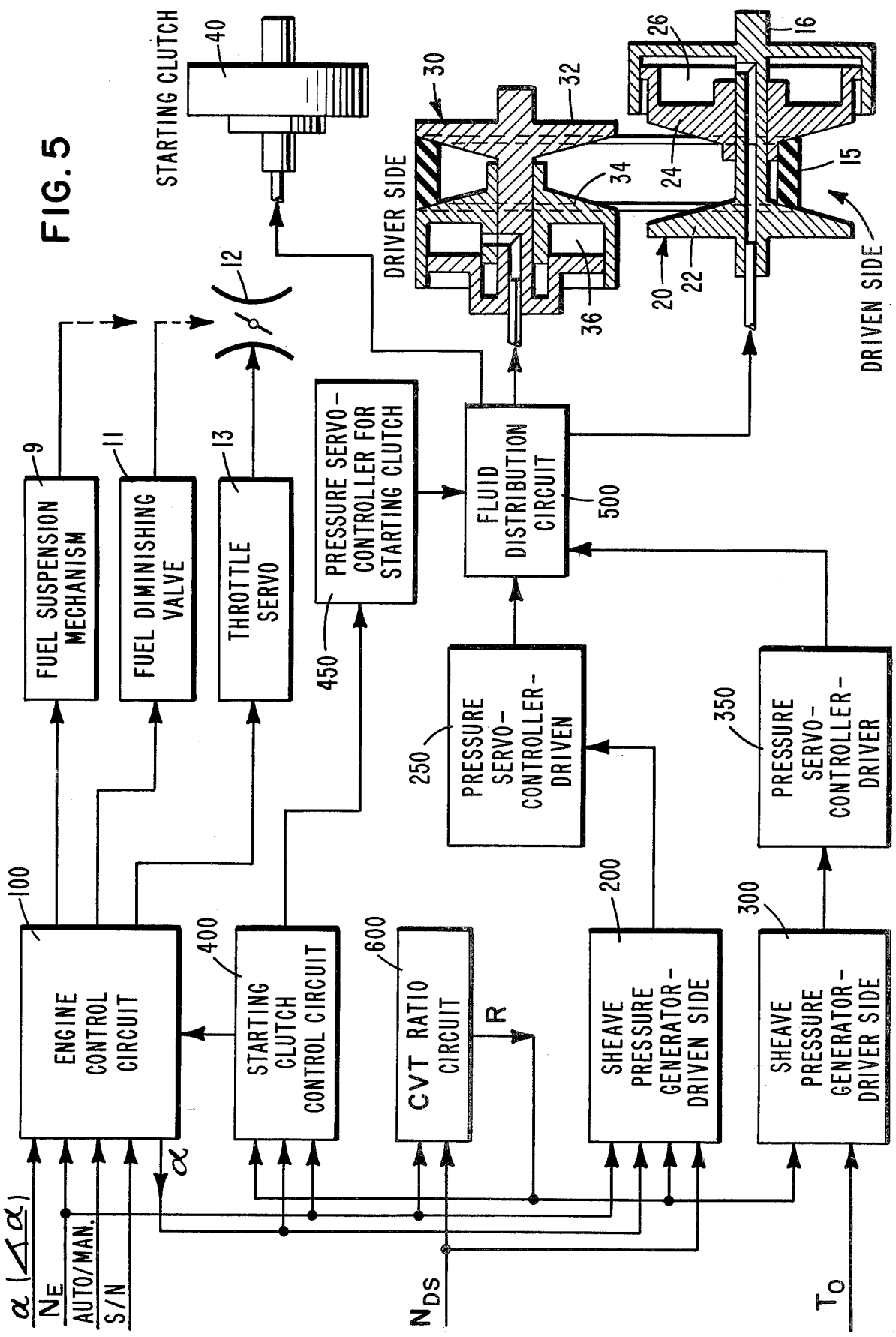
FIG. 5 is a schematic illustration showing the entire control system of the invention and its relationship to the CVT sheave and belt drive, and the vehicle starting clutch.

FIG. 5 schematically illustrates the entire control system in greater detail. The particular type of CVT illustrated in FIG. 5 is the variable diameter pulley, V-belt traction drive type having a driven sheave 20 connected to output shaft 16 and a driver sheave 30 which is coupled to engine 10. Belt 15 interconnects sheaves 20 and 30 to transmit motive power therebetween. Sheaves 20 and 30 are hydraulically actuated by pressurized fluid to vary the driving diameters. Sheave 20 has an axially fixed portion 22 and an axially movable portion 24. Pressurized fluid in a fluid chamber 26 behind movable portion 24 provides the axial force required to maintain portions 22 and 24 at a fixed distance from one another (i.e., to hold the driving diameter of sheave 20 constant), and to move portion 24 toward or away from portion 22 to vary the driving diameter. Similarly, sheave 30 has an axially fixed portion 32 and a movable portion 34 which is under the influence of fluid pressure in chamber 36. Proper pressures in chambers 26 and 36 to keep belt 15 under proper tension are maintained by the control system, as described below.

The position of throttle (fuel delivery means) 12 is controlled by a throttle servo 13 which receives signals from engine control circuit 100. During certain transient operations (described below) fuel delivery may be diminished by a fuel diminishing valve 11, or fuel delivery may be suspended completely by a fuel suspension mechanism 9. The fuel diminishing and suspension functions may be performed, for example, by a single solenoid valve operable in variable modes. Engine control circuit 100 is responsive to inputs from the accelerator pedal (α), engine speed ($N_E$), a manual override switch which permits operation in the automatic or manual mode, and a start/neutral switch (S/N) which insures that the vehicle will remain stationary when the engine is started.

Fluid pressure for activating the driven sheave is provided by a sheave pressure generator 200 which acts through a pressure servo controller 250 and a fluid distribution circuit 500. Similarly, fluid pressure for activating the driver sheave 30 is provided by sheave pressure generator 300 acting through a servo controller 350 and fluid distribution circuit 500. Pressure generator 200 is responsive to inputs of engine speed $N_E$, accelerator position α, drive shaft speed $N_{DS}$ measured by a sensor associated with drive shaft 16, and CVT ratio R. Ratio R is generated by CVT ratio circuit 600 and is the quotient of engine speed $N_E$ divided by drive shaft speed $N_{DS}$.

A starting clutch 40 is provided which couples engine 10 and CVT 14. Clutch 50 is disengaged when the vehicle is stationary, and is partially engaged during slow vehicle operation, gradually approaching full engagement, which occurs as described below at a predetermined point of operation. Starting clutch 40 is controlled by a control circuit 400 which is responsive to accelerator pedal position $\alpha$, engine speed $N_E$ and the auto/manual switch, through servo controller 450 and fluid distribution circuit 500.

Figure 1:
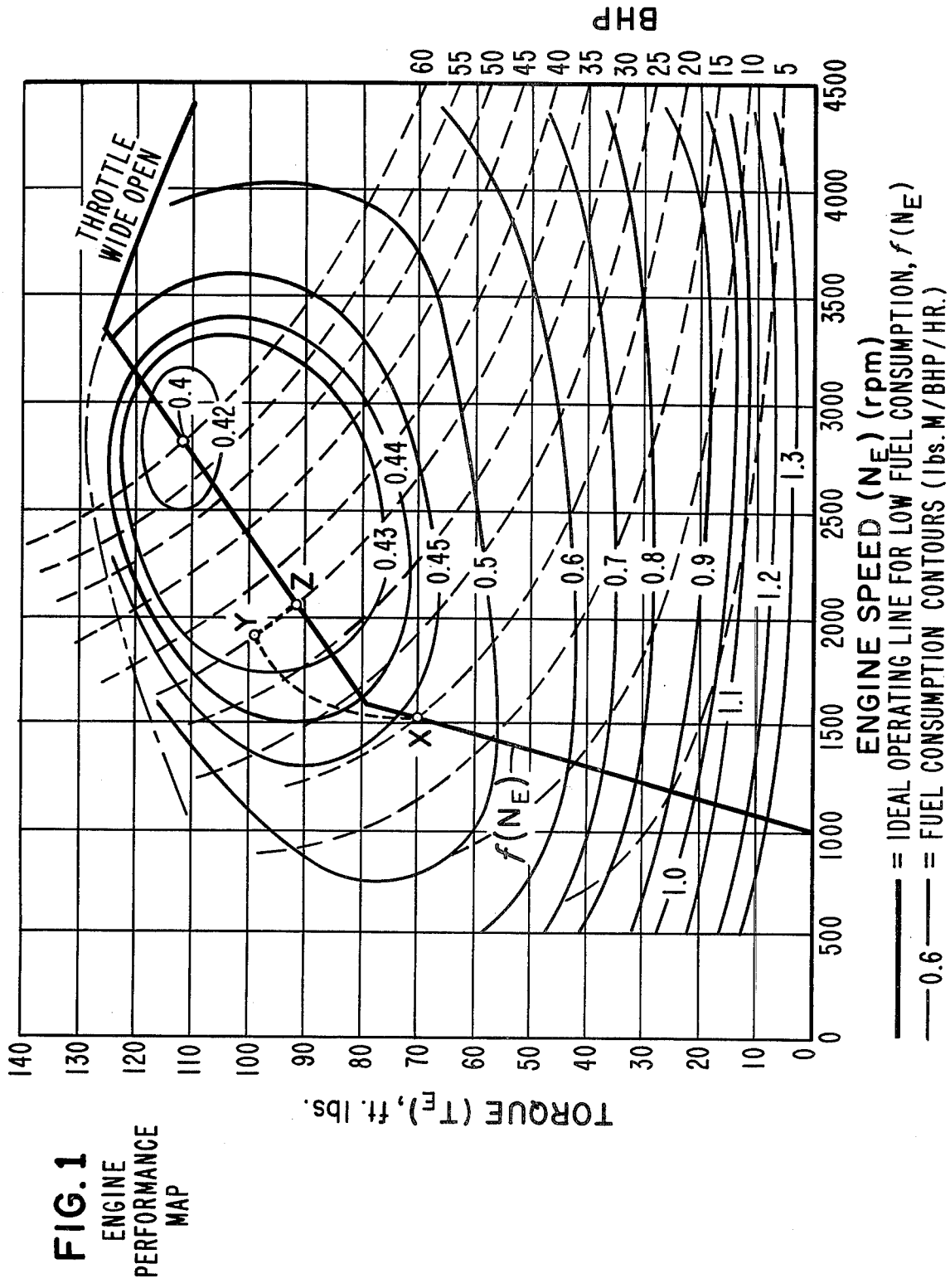
FIG. 1 is the performance map of a typical four cylinder passenger car engine having a displacement of approximately 2.5 liters.
Figure 2:
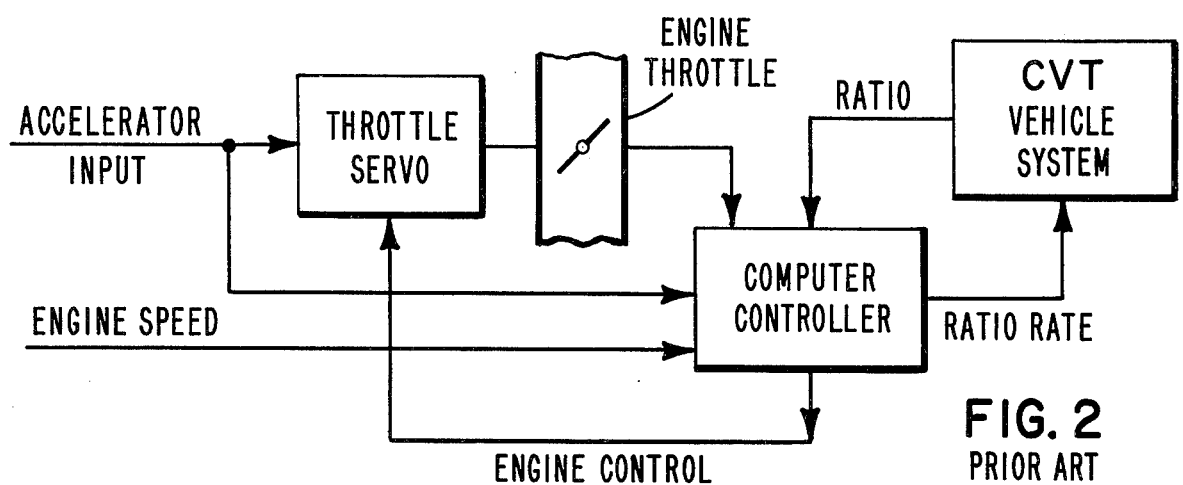
FIGS. 2 and 3 illustrate two forms of prior art engine-CVT control schemes.
Figure 3:
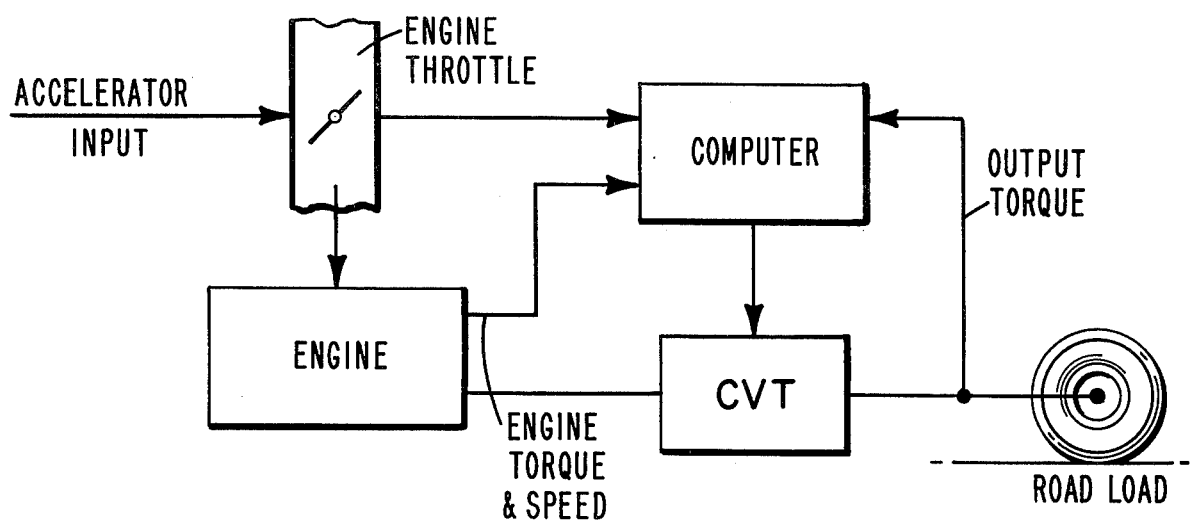
Figure 7:
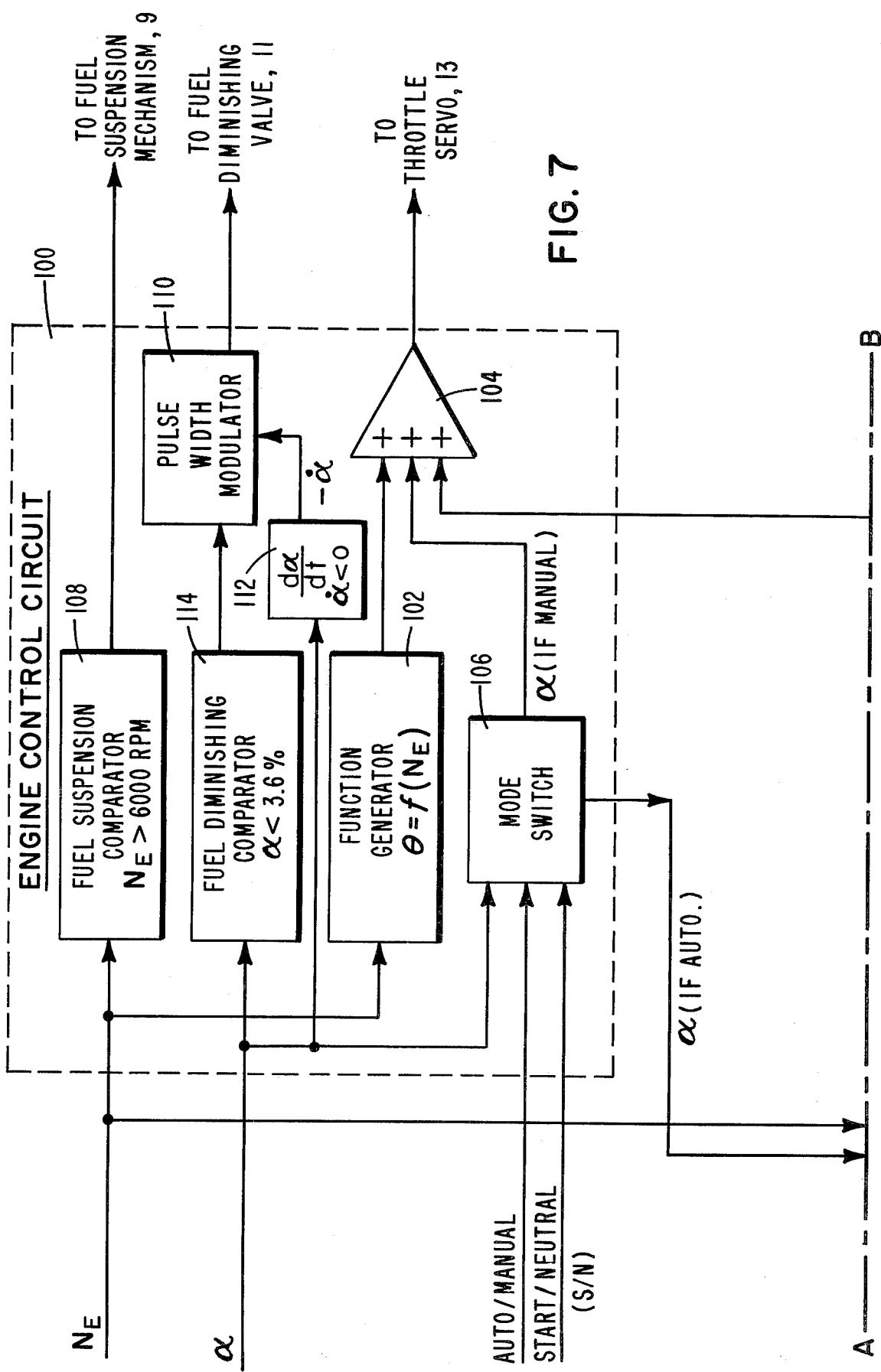
FIGS. 7 through 10 together schematically represent the entire engine-CVT control scheme according to the invention, the figures being interrelated as indicated therein by lines A-B and C-D.
Figure 8:
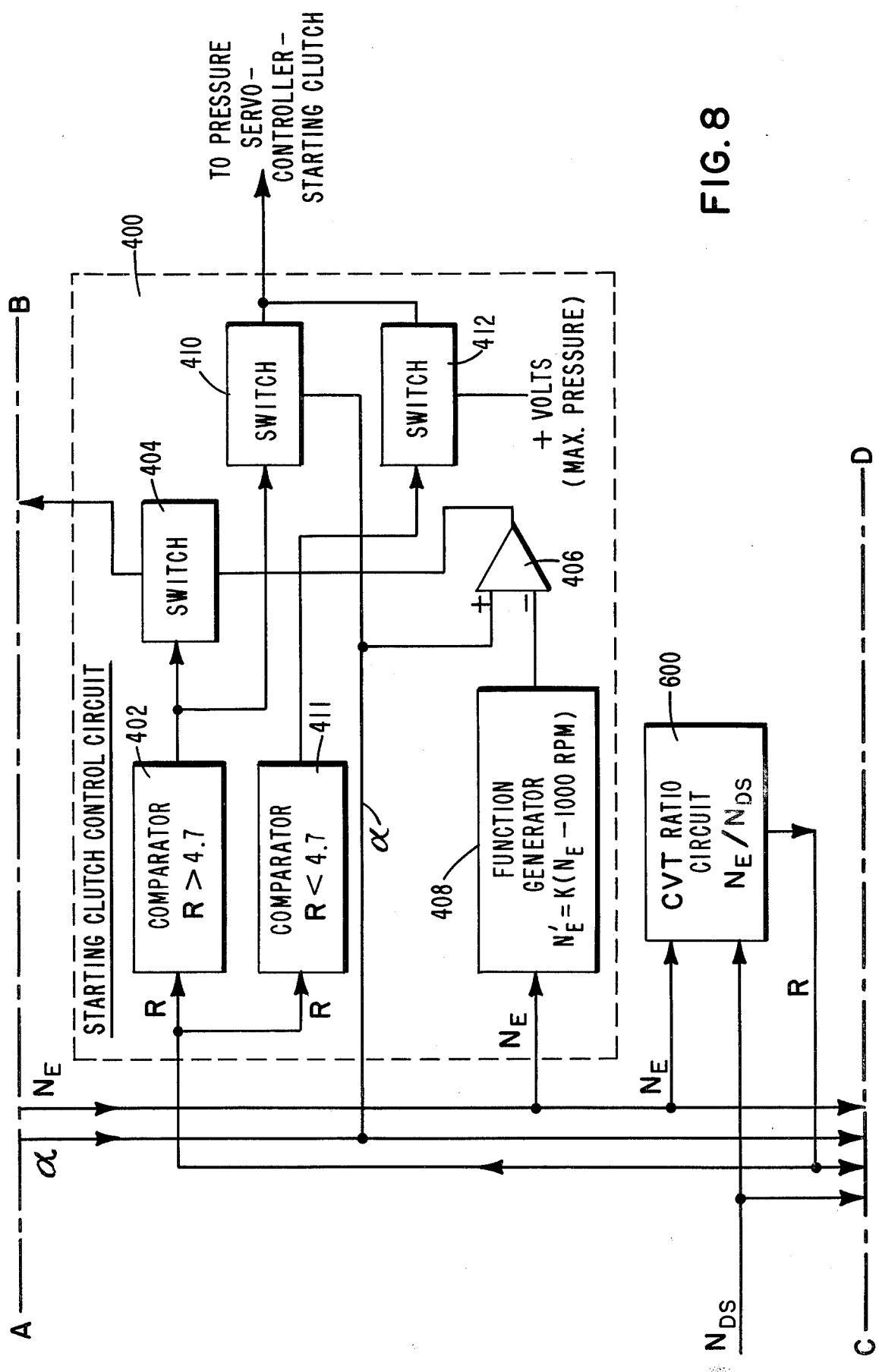
Figure 9:
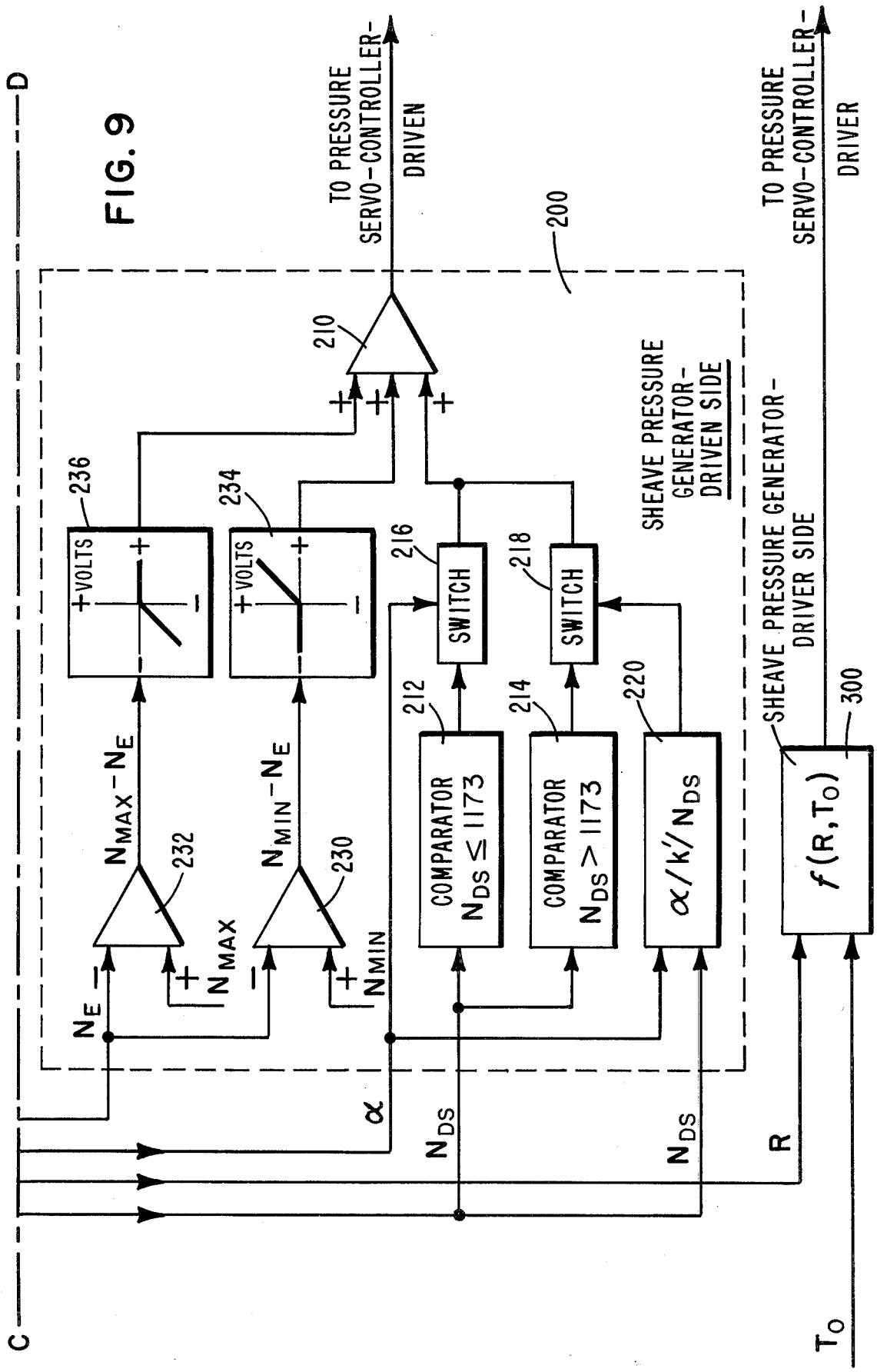

FIGS. 7, 8 and 9 schematically illustrate in greater detail the functional relationships of the components illustrated in FIG. 5. FIG. 7 is primarily directed to the engine control circuit 100. A key element of control circuit 100 is function generator 102, which may generate a function representative of any desired engine operating characteristic. For this embodiment the function $\theta$ is chosen as the ideal engine operating line for low fuel consumption. $\theta$ represents throttle angle, which is proportional to desired engine output torque. FIG. 1 graphically illustrates this function as $f(N_E)$. The value of the function produced by generator 102 is fed directly to throttle servo 13 via amplifier 104. In the event the automatic control system is disabled, it is possible to switch to a manual mode through mode switch 106. In the manual mode, accelerator position $\alpha$ is directly communicated to throttle servo 13 via amplifier 104. The start/neutral switch S/N also operates through mode switch 106.

A fuel suspension comparator 108 provides for engine overspeed control, which may tend to occur upon vigorous acceleration or if there is a malfunction in the control system. Comparator 108 compares engine speed $N_E$ to the maximum permissible engine speed, for example, 6000 rpm. If $N_E$ is greater than 6000 rpm, fuel suspension mechanism 9 is activated to suspend delivery of fuel to engine 10. Fuel suspension mechanism 9 may be, for example, a solenoid cutoff valve.

Another engine speed control is provided to counteract the inherent tendency of the vehicle to speed up when the accelerator pedal is released. This phenomenon occurs upon deceleration because the vehicle inertia becomes coupled to the inertia of a relatively unthrottled engine through a transmission whose ratio is changing towards overdrive. This undesirable tendency is even more pronounced when the accelerator pedal is released suddenly and completely. This anomalous behavior is prevented by reducing fuel flow to the engine when pressure on the accelerator pedal is relieved, the reduction of fuel flow being proportional to the rate at which pedal position decreases ($-\dot{\alpha}$), and by reducing fuel flow even further when the accelerator pedal position $\alpha$ drops to below 3.6% of full excursion. To accomplish this control, a pulse width modulator 110 controls fuel diminishing valve 11, the duty cycle (i.e., the percentage of the pulse cycle during which fuel diminishing valve is held open) of modulator 110 being inversely proportional to the rate at which pedal position $\alpha$ decreases ($-\dot{\alpha}$). $-\dot{\alpha}$ is derived from a differentiator 112 only if $\dot{\alpha}$ is less than zero. In addition, a fuel diminishing comparator 114 reduces the duty cycle of modulator 110 to or near zero when pedal position $\alpha$ drops to below 3.6%.

FIG. 8 relates primarily to the starting clutch control circuit 400. It will be appreciated that some type of coupling must be provided between the engine and the CVT in order to permit the engine to idle while the vehicle is stationary. A fluid coupling could be used, but the mechanical losses inherent in such a device are antithetical to the desired objective of maximizing fuel economy. A torque converter with a lock-up clutch would be an improvement, but a mechanical clutch is preferred, and one which is hydraulically actuated would be well suited for this purpose. The object here, as in the conventional automobile, is to totally disengage the clutch when the vehicle is stationary, and to gradually engage it to begin vehicle movement and progressively engage the clutch further as the vehicle speed increases. To this end the measured transmission ratio R (which is computed as the quotient of engine speed $N_E$ and drive shaft speed $N_{DS}$ by ratio circuit 600) is fed to a comparator 402. Comparator 402 closes switch 404 when R exceeds 4.7 to deliver the signal from amplifier 406 to throttle servo 13 via amplifier 104. This signal is equal to $\alpha - N_E'$, where $N_E'$ is a function produced by generator 408 equal to K ($N_E$ – 1000 rpm). Thus, the accelerator pedal 18 is coupled directly to throttle 12 in a variable way defined by $\alpha - N_E'$. The constant K is selected such that engine speed cannot exceed 2500 rpm if the clutch is not fully engaged. This direct coupling of accelerator pedal to throttle allows an input to be provided to the system to initiate movement of the vehicle from a stationary position.

Comparator 402 also closes switch 410 to transmit pedal position $\alpha$ directly to the clutch pressure servo controller 450. Hence, the degree of engagement of clutch 40 is proportional to pedal position up to the point where ratio R equals 4.7. During this period the degree of direct control of the accelerator pedal over throttle 12 diminishes as engine speed increases in accordance with the above-described relationship.

When ratio R drops below 4.7, switches 404 and 410 open, and comparator 411 closes switch 412 to deliver maximum pressure to the clutch servo controller 450. Maximum pressure causes full engagement of the clutch. As the vehicle accelerates beyond this point, it is under total automatic control.

It can be seen that if no start/neutral S/N switch were provided, any depression of accelerator pedal 18 upon startup would cause engagement of clutch 40 and a forward lurch of the vehicle. The S/N switch therefore effectively disables the effect of $\alpha$ on clutch 40 to permit safe startup.

FIG. 9 relates primarily to the sheave pressure generator for the driven sheave 200 and the sheave pressure generator for the driver sheave 300. Pressure generator 200 includes circuitry which changes the transmission ratio to increase the load on the engine if the engine tends to exceed the maximum operating speed of 5500 rpm ($N_{MAX}$). Also provided is circuitry for changing the transmission ratio to decrease the load on the engine should the engine speed tend to decrease below the idle speed of 1000 rpm ($N_{MIN}$). This accomplished by means of summing amplifiers 230, 232 and clipping circuits 234, 236. Summing amplifier 232 and clipping circuit 236 act to reduce pressure on the driven sheave 200 to increase the load on the engine. Amplifier 232 receives $N_E$, applied to its negative input terminal, and $N_{MAX}$, applied to its positive input terminal, and produces a summed output signal $N_{MAX} - N_E$. This summed output is applied to clipping circuit 236 which is a non-linear device having the characteristic shown in FIG. 9. This device can be, for example, a reverse biased diode which produces a negative substantially linear output for negative excursions of its input signal and a zero output for positive excursions.

Consequently, if $N_E$ exceeds $N_{MAX}$, the input signal applied to circuit 236 will be negative, thereby resulting in a negative output signal. This negative output signal is then applied to summing amplifier 210 to reduce the value of its summed output signal in proportion to the amount $N_E$ exceeds $N_{MAX}$. As a result, the pressure on driven sheave 200 will be proportionally decreased. On the other hand, if $N_E$ is less than $N_{MAX}$, the input signal applied to clipping circuit 236 will be positive resulting in a zero output signal applied to amplifier 210. Such an output signal has no affect on the summed output signal of amplifier 210; thus, no change in the signal supplied to the driven servo-controller 250 is produced.

Summing amplifier 230 and clipping circuit 234 act to increase pressure on the driven sheave 200 to decrease the load on the engine. Amplifier 230 receives $N_E$, applied to its negative input terminal, and $N_{MIN}$, applied to its positive input terminal, and produces a summed output signal $N_{MIN}-N_E$. This summed output is applied to a clipping circuit 234 similar to circuit 236. Circuit 234, however, has a nonlinear transfer characteristics which produces a positive substantially linear output for positive excursions of its input signal and a zero output for negative excursions. Circuit 234 can be, for example, a forward biased diode. If $N_E$ falls below $N_{MIN}$, the input signal applied to clipping circuit 234 will be positive, thereby resulting in a positive output signal. This positive output signal is then applied to summing amplifier 210 to increase the value of its summed output signal in proportion to the amount $N_E$ is less than $N_{MIN}$. As a result, the pressure on driven sheave 200 will be proportionally increased. On the other hand, if $N_E$ is greater than $N_{MIN}$, then a zero output signal will be produced by circuit 234 which has no affect on the summed signal applied to servo-controller 250.

Pressure generator 200 also includes circuitry for adjusting the sensitivity of accelerator pedal 18, depending on vehicle speed, to more closely simulate the "feel" of a conventional vehicle. This is required because of the inherent operating characteristics of the engine and CVT. That is, at higher vehicle speeds, the torque produced by the engine remains fairly high and constant (see FIG. 1). In the conventional vehicle the remaining small percentage of torque which can be extracted from the engine is delivered to the rear wheels through a transmission in high gear with a fixed, very low reduction ratio. Vehicle acceleration is therefore fairly insensitive to accelerator pedal movement at high speeds. In a CVT equipped vehicle, however, depression of the accelerator pedal even at high vehicle speeds results in an increased reduction ratio and an associated multiplication of torque in excess of that provided in the conventional vehicle. Thus, if only direct accelerator pedal position $\alpha$ were used to control CVT ratio at higher vehicle speeds, vehicle response would be extremely sensitive to accelerator pedal movement. The sensitivity of the accelerator pedal 18 must therefore be dulled at higher vehicle speeds.

Pedal sensitivity is controlled by two comparators 212, 214. As long as vehicle speed is below a threshold equivalent of drive shaft speed $N_{DS}$ equal to or less than 1173 rpm, switch 216 remains closed to deliver the $\alpha$ signal directly to amplifier 210. This effectively is torque control. When drive shaft speed $N_{DS}$ exceeds 1173 rpm, switch 216 opens and switch 218 is closed so that a pedal position signal equivalent to $\alpha$ divided by $N_{DS}$ (provided by divider 220) is delivered to amplifier 210. This effectively is power control. In this way, the effect of any movement of accelerator pedal 18 in the higher speed ranges is diminished so as to more closely simulate the pedal response of a conventional automobile.

Figure 10:
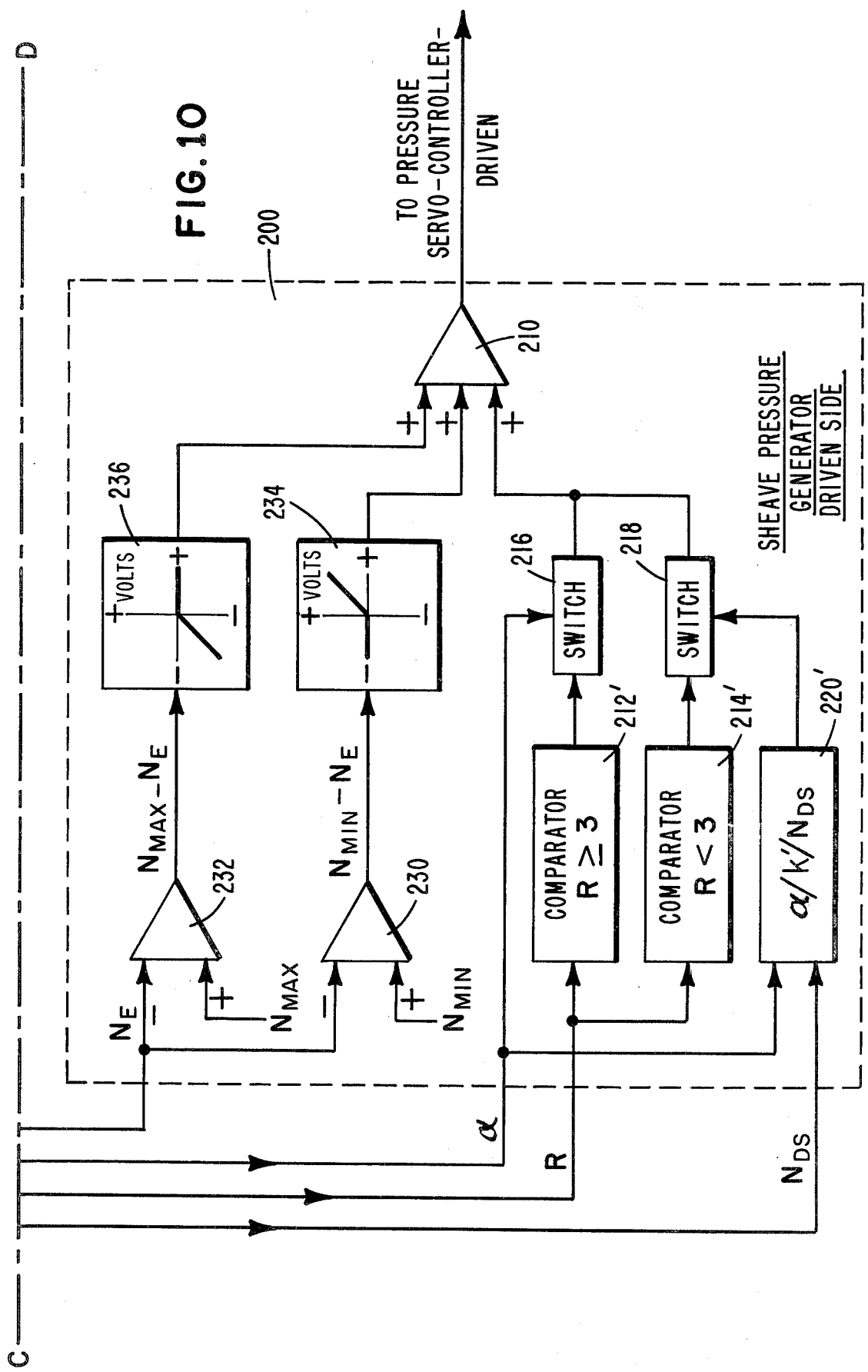

FIG. 10 shows a modification of the sheave pressure generator 200, wherein accelerator sensitivity is controlled as a function of ratio R. Comparator 212' closes switch 216' to connect the accelerator pedal position signal $\alpha$ directly to amplifier 210 when ratio R equals or exceeds 3. The comparator 214' closes switch 218' to feed a dulled signal to amplifier 210 from divider 220' when ratio R is below 3.

The control of transmission ratio described above actually is a ratio rate control, $\dot{R}$. That is, the greater the magnitude of the increase (or decrease) in fuel pressure on driven sheave 20 commanded by accelerator pedal 18, the more rapid the change of sheave diameters will be. Thus, for example, a rapid depression of accelerator pedal 18 will result in a rapid change of CVT ratio and quick acceleration. This, of course, closely simulates the characteristics of a conventional vehicle.

The instant invention involves, in part, the recognition that control of the ratio rate $\dot{R}$ of the CVT, rather than merely the CVT ratio, yields improved CVT control. This improved control is explained by reference to the following derived vehicle performance equation:

$$\dot{N}_{DS} = \frac{-\dot{R}I_E N_E}{I_{EQ}} + \frac{RT_E - T_{RL} - T_{loss}}{I_{EQ}}$$

where $I_{EQ} = I_{CDS} + R^2 I_E$,
$\dot{R}$ is the ratio rate of the transmission,
R is the ratio of the transmission,
$I_E$ is engine inertia,
$N_E$ is engine speed,
$T_E$ is engine torque,
$T_{RL}$ is road load torque reflected to the drive shaft and includes tires, final drive and axle losses,
$T_{loss}$ is transmission loss,
$I_{CDS}$ is car inertia reflected to the drive shaft, and
$\dot{N}_{DS}$ is vehicle acceleration measured at the drive shaft.

It is clear that the acceleration of the vehicle $\dot{N}_{DS}$ is dependent primarily upon control of any one or more of these variable such as, for example, $T_E$, R or $\dot{R}$. Generally, conventional vehicle systems vary the transmission ratio R and engine output torque $T_E$ to provide the required transmission and vehicle control. By controlling R, however, it is difficult to constantly maintain engine torque and speed along the ideal operating line. This is due to the fact that each time R is varied, the load on the engine is changed which, in turn, affects the engine's output torque and vehicle acceleration.

Attempts to simultaneously change the engine torque and speed to force engine operation back on the ideal line have necessitated very complex control systems, since control is dependent on several variables of the performance system. For example, these systems must necessarily perform the complicated task of calculating the necessary target throttle position and CVT ratio R to force engine operation back on the ideal line. These systems also require the calculation of ratio rate $\dot{R}$ so that the rate in changing the ratio to the target value does not result in undesirable vehicle dynamics. For example, if $\dot{R}$ is selected to be excessive then an undesirable deceleration of the vehicle will occur before the vehicle can accelerate. This phenomenon results from the negative sign of the $\dot{R}$ term in the above performance equation.

This invention, however, recognizes that $\dot{R}$ can easily be sensed and controlled without casing the other variables to adversely affect engine performance. This is accomplished by separating the engine control from the transmission control so that engine torque and speed are fixed along the ideal engine operating line. As a result of controlling $\dot{R}$ no adverse affect on the other dependent variables occur. In particular, changing $\dot{R}$ along, with its concomitant change on R, will not force engine operation off the ideal operating line since engine speed and torque are determined solely by the fuel function $f(N_E)$. As a result, vehicle acceleration $\dot{N}_{DS}$ and output torque $T_O$ are controlled solely by ratio rate $\dot{R}$, rather than by the other variables of the performance system.

It has been discovered in accordance with this invention that rate of change of ratio ($\dot{R}$) is closely approximated by the following relationships:

$$k\dot{R} = a - T_O \text{ (for low speeds: torque control)}$$

and $$k\dot{R} = a/k'N_{DS} - T_O \text{ (for high speeds: power control)}.$$

In the V-belt traction drive CVT of the preferred embodiment of the invention, the comparison of accelerator pedal position $a$ and output torque $T_O$ occurs inherently in the belt and pulley components to effect a ratio change at a rate $\dot{R}$. Other types of CVTs may require different control elements to effect this relationship. As stated earlier, however, other parameters indicative of system performance may be used to effect a ratio change at a rate $\dot{R}$, where $\dot{R}$ is proportional to the difference between the desired performance parameter and the actual measured performance parameter.

Figure 11:
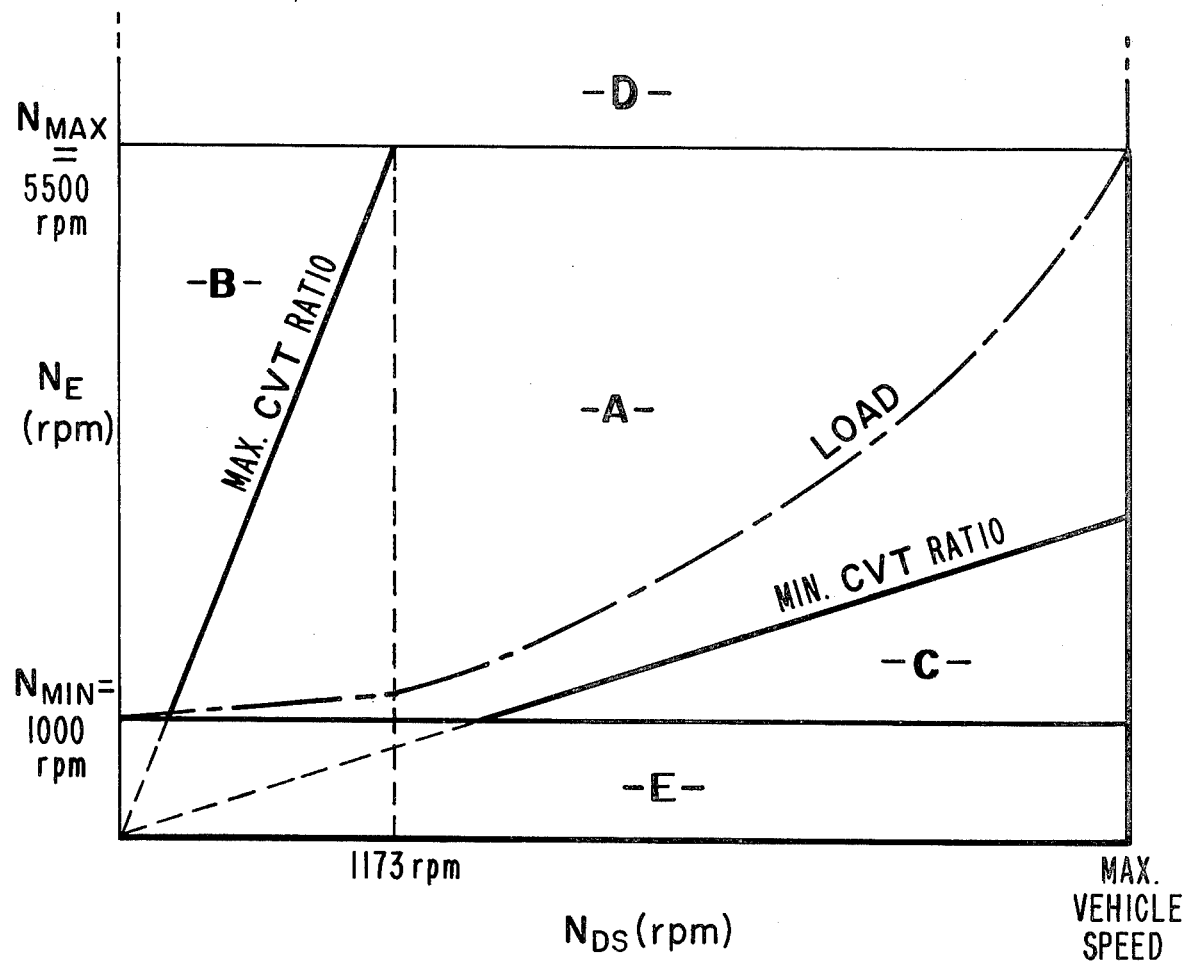
FIG. 11 is a graphical representation of the operation of an engine-CVT system in accordance with the control scheme of the invention.

The above described control scheme of the invention is graphically illustrated in FIG. 11. FIG. 11 is a plot of engine speed $N_E$ as a function of vehicle speed or drive shaft speed $N_{DS}$. The minimum and maximum CVT ratios are illustrated by the straight lines emanating from the origin of the graph. The idle speed ($N_{MIN}$ = 1000 rpm) is indicated by a lower horizontal line, while the maximum permissible engine speed ($N_{MAX}$ = 5500 rpm) is indicated by an upper horizontal line. The maximum vehicle speed is defined by a vertical line at the right hand edge of the graph.

The graph of FIG. 11 is divided into a number of discrete operating regions. "A" designates the normal region of operation of the engine-CVT system. Region "A" is bounded by the line of maximum CVT ratio, the line of maximum engine speed, the line of maximum vehicle speed, the line of minimum CVT ratio and the idle speed line. During operation of the system in region "A", cluth 40 is fully engaged and throttle position is wholly a function of engine speed in accordance with the fuel function $f(N_E)$. Operation to the left of the dashed vertical line indicating a drive shaft speed of 1,173 rpm is under torque control, while operation to the right of this line is under power control (see the above two equations, and the accelerator pedal sensitivity circuitry illustrated in FIGS. 9 and 10). Region "B" is the region of start-up control, that is, the operation of the engine-CVT system during slow vehicle operation when clutch 40 is only partially engaged. The control for this operation (400) is illustrated in FIG. 8.

Operation of the engine-CVT system in the remaining three regions "C", "D" and "E" is effectively prevented by the above described control system. That is, operation in region "C" is prevented by the physical limitation of minimum CVT ratio, and by the fuel diminishing circuits comprising fuel diminishing valve 11, pulse width modulator 110, differentiator 112 and fuel diminishing comparator 114 of engine control circuit 100 (FIG. 7). Region "D" is the region of overspeed control, governed by the fuel suspension mechanism 9 and fuel suspension comparator 108 of engine control circuit 100 (FIG. 7), and by amplifier 232 and clipping circuit 236 of sheave pressure generator 200 (FIG. 9). Region E is the region of engine idle control which is governed by amplifier 230 and clipping circuit 234 of sheave pressure generator 200 (FIG. 9).

Also shown on the graph of FIG. 11 is a load line which indicates the engine speed required to maintain any constant vehicle speed along a level road. The term "load" includes road load, final drive losses and the like, and represents the actual load on the engine-CVT system. In order for the control scheme of the invention to function only in accordance with the fuel function so as to maintain engine operation along the ideal operating line, it is desirable that the CVT ratio range include substantially all ratios required to maintain constant vehicle speed for any normally encountered load. That is, the minimum CVT ratio preferably is smaller than that required to maintain constant vehicle speed along a level road, and the maximum CVT ratio preferably is greater than that required to maintain constant vehicle speed up the steepest grade which one might expect to encounter. This relationship is graphically illustrated by the physical location of the load line in the graph of FIG. 11 above the line of minimum CVT ratio in region "A". All other load lines should lie below the line of maximum CVT ratio. A desirable CVT ratio range for accomplishing this is approximately 11:1 with, for example, a maximum CVT ratio of 22:1 (total vehicle ratio, including final drive ratio), and a minimum CVT ratio is 2:1. A transmission having such a wide ratio range is disclosed in commonly assigned application Ser. No. 290,293, filed Aug. 5, 1981. Of course, a CVT having a smaller ratio range would be operable, but would not have as much flexibility as one with a wider range.

Figure 6:
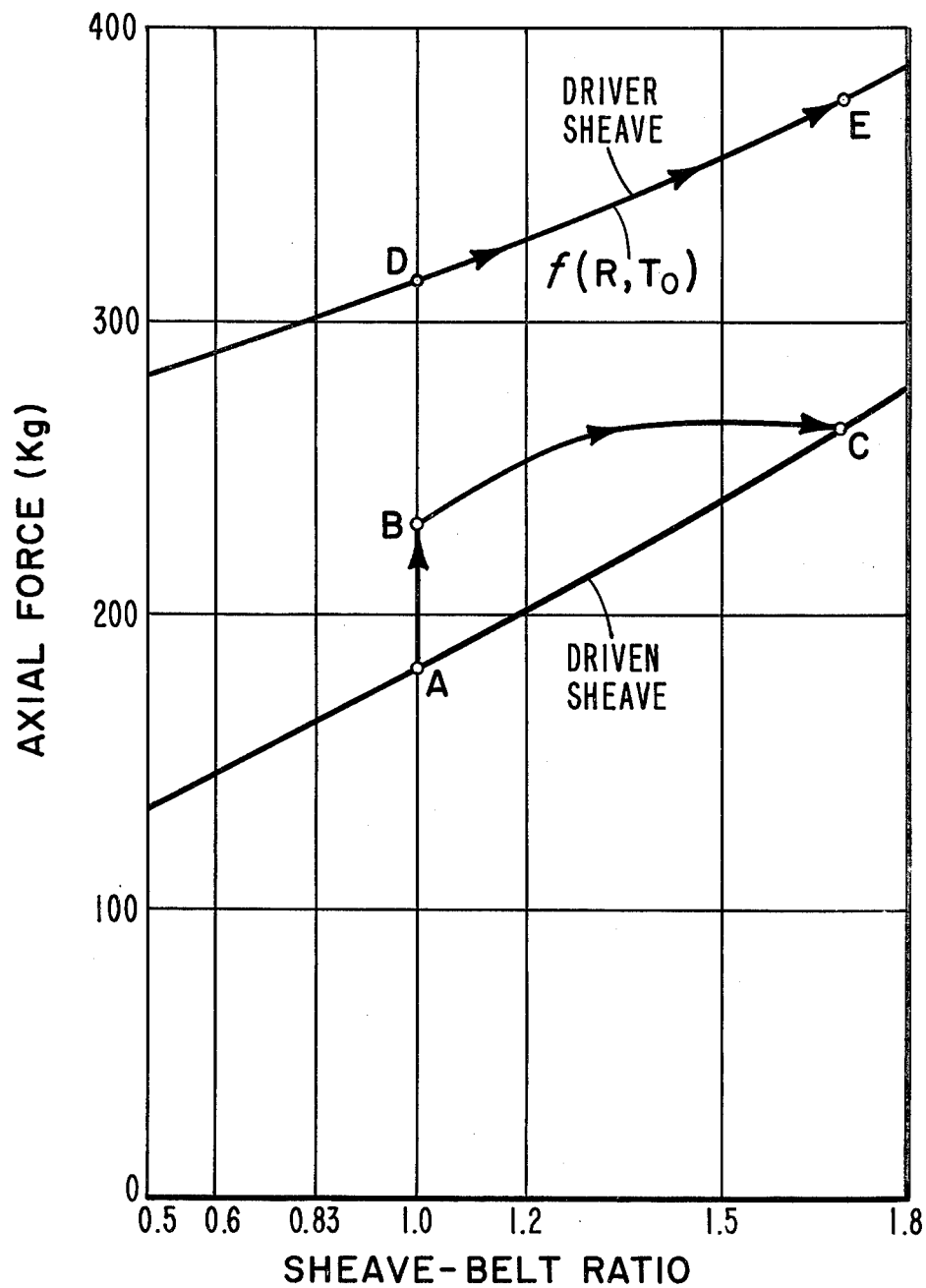
FIG. 6 is a graph which shows the forces applied to the driver and driven sheaves of the CVT as a function of transmission ratio.

Referring to FIG. 6, the mechanics of a change in CVT ratio now will be described with reference to the axial forces produced by the pressurized fluid in chambers 26 and 36. The lower curve in FIG. 6 is a plot of steady state axial force on movable portion 24 of driven sheave 20 as a function of CVT ratio. Similarly, the upper curve is a plot of steady state axial force tending to resist inward movement of movable portion 34 as a function of CVT ratio. As described below, when for example a signal is generated to increase the ratio of the CVT from 1.0 to approximately 1.7, the fluid pressure in chamber 26 is increased to raise the axial force from approximately 175 kg. to, ultimately, approximately 270 kg. Movable portion 24 does not move instantaneously, however, due to the inertia of the system. Accordingly, the curve which represents the transient change taking place in sheave 20 is defined by movement from point A to point B at a constant ratio of 1.0, and then to point C where equilibrium is reached. Correspondingly, an increase in pressure in chamber 36 of driver sheave 30 results in an increase in axial force on movable portion 34 of sheave 30 from approximately 315 kg. (point D) to approximately 380 kg. (equilibrium point E). Despite this increase in axial force, the increased tension on belt 15 occasioned by expansion of the diameter of sheave 20 forces the two portions 32, 34 of sheave 30 apart so that sheave 30 has a smaller driving diameter. Driver sheave 30, therefore, follows in a controlled manner any changes occurring to driven sheave 20.

Sheave pressure generator 300 generates a pressure appropriate for driver sheave 30 as a function of ratio R and measured output torque $T_O$. This function has been found to satisfactorily tension belt 15, without undue stress, and effect a smooth change of ratio. An example of a function suitable for this purpose is as follows:

$$P_{DR} = K_1 + (K_2 - /R + K_3)T_O$$

where $P_{DR}$ is the fluid pressure in chamber 36 of driver sheave 30, and $K_1$, $K_2$ and $K_3$ are appropriately selected constants.

The above-described control scheme quite simply and effectively accomplishes its primary objective of maintaining engine operation along the ideal operating line, for example, that of minimum fuel consumption. Transmission control requires output torque and accelerator pedal position sensing, while engine control requires only engine speed sensing. The specific parameter values set forth in the preferred embodiment described above are in no way intended to limit the scope of the invention, it being apparent that these parameters will vary in accordance with engine, transmission and vehicle design, and desired behavior and performance. While an electronic control system has been schematically illustrated in the preferred embodiment, it is to be understood that any type of control system which functions in a similar manner may be used. It would appear that a control system incorporating many mechanical components would perhaps be the most reliable and least expensive alternative. Numerous other modifications of the invention will be apparent to those skilled in the art without departing from the true spirit and scope of the invention which is defined by the appended claims.

I claim:

1. A method of controlling the operation of a power delivery system including a prime mover and a continuously variable ratio transmission coupled to said prime mover for delivering power from said prime mover to an output shaft, said prime mover having fuel delivery means for delivering a variable quantity of fuel thereto, said power delivery system being controlled by command means for commanding a desired system performance, the method comprising the steps of:
   measuring the actual performance of the power delivery system;
   controlling the ratio of said transmission as a function of the desired system performance commanded by said command means and said measured actual system performance, the speed of said prime mover varying as a function of transmission ratio;
   predetermining a fuel function defining desired fuel requirements for said prime mover in relation to prime mover operating speed;
   measuring the speed of said prime mover; and
   controlling said fuel delivery means only in accordance with said fuel function so that the fuel delivered to said prime mover is determined only by the speed thereof.

2. The method of claim 1 wherein the step of controlling the ratio of said transmission comprises changing the ratio of said transmission at a rate which is proportional to the difference between the desired system performance and the actual measured system performance.

3. The method of claim 1 wherein the desired system performance commanded by said command means is desired output power or torque delivered to said output shaft, and the actual measured system performance is actual measured torque delivered to said output shaft.

4. The method of claim 3 wherein the step of controlling the ratio of said transmission comprises:
   changing the ratio of said transmission at a rate which is proportional to the difference between the power or torque commanded by said command means and said measured output torque.

5. The method of claim 3 wherein the step of controlling the transmission ratio further comprises decreasing the ratio to increase the load on the prime mover if the measured speed of the prime mover exceeds a predetermined maximum operating speed.

6. The method of claim 3 wherein the step of controlling the transmission ratio further comprises increasing the ratio to decrease the load on the prime mover if the measured speed of the prime mover falls below a predetermined minimum permissible operating speed.

7. The method of claim 3 wherein said prime mover is the engine of an engine-driven vehicle, the method further comprising the step of decreasing the sensitivity of said command means during relatively fast vehicle operation.

8. The method of claim 7 further comprising the steps of:
   measuring the speed of said output shaft;
   generating a ratio signal equal to the quotient of measured engine speed and measured output shaft speed;
   comparing said ratio signal to a predetermined fast operation ratio; and
   controlling the transmission ratio as a function of said measured output torque and output torque commanded by said command means, the commanded output torque being modified by the inverse of the measured output shaft speed when said ratio signal falls below said fast operation ratio, so that said power delivery system responds to commanded power during relatively fast vehicle operation, and responds to commanded torque during slower vehicle operation.

9. The method of claim 7 further comprising:
   measuring the speed of said output shaft;
   comparing said measured output shaft speed to a predetermined fast operation threshold value; and
   controlling the transmission ratio as a function of said measured output torque and output torque commanded by said command means, the commanded output torque being modified by the inverse of the measured output shaft speed when said measured output shaft speed exceeds said fast operation threshold value, so that said power delivery system responds to commanded power during relatively fast vehicle operation and responds to commanded torque during slower vehicle operation.

10. The method of claim 3 wherein said fuel function is the prime mover ideal operating line for low fuel consumption.

11. The method of claim 3 wherein said prime mover is an internal combustion engine.

12. The method of claim 11 wherein said fuel delivery means comprises a throttle.

13. The method of claim 3 wherein said prime mover is the engine of an engine-driven vehicle.

14. The method of claim 13 wherein said fuel delivery means comprises a throttle.

15. The method of claim 13 further comprising the step of operatively coupling said command means to said fuel delivery means during stationary and relatively slow vehicle operation.

16. The method of claim 15 wherein the step of operatively coupling said command means to said fuel delivery means comprises:
   measuring the speed of said output shaft;
   generating a ratio signal equal to the quotient of measured engine speed and measured output shaft speed;
   comparing said ratio signal to a predetermined slow operation ratio; and
   operatively coupling said command means to said fuel delivery means when said ratio signal exceeds said slow operation ratio.

17. The method of claim 15 wherein said engine and said transmission are coupled by a clutch which is disengaged when said vehicle is stationary and is partially engaged during slow vehicle operation, wherein the output torque commanded by said command means is diminished in proportion to engine speed so that excessive clutch slippage is prevented.

18. The method of claim 15 wherein said engine and said transmission are coupled by a clutch, the method further comprising the steps of:
   measuring the speed of said output shaft;
   generating a ratio signal equal to the quotient of measured engine speed and measured output shaft speed;
   comparing said ratio signal to a predetermined slow operation ratio; and
   operatively coupling said command means to said clutch when said ratio exceeds said slow operation ratio, so that said clutch is disengaged when said vehicle is stationary, and is partially engaged during slow vehicle operation.

19. The method of claim 13 further comprising the step of diminishing fuel flow to said fuel delivery means when the power or torque commanded by said command means falls below a predetermined minimum value.

20. The method of claim 16 further comprising the step of suspending fuel flow to said fuel delivery means when the speed of said engine exceeds a predetermined maximum permissible value.

21. The method of claim 3 wherein the transmission provides substantially all ratios required to maintain constant output shaft speed for any normally encountered load while said fuel delivery means is controlled only in accordance with said fuel function.

22. A system for controlling the operation of a power delivery system including a prime mover and a continuously variable ratio transmission coupled to said prime mover for delivering power from said prime mover to an output shaft, said prime mover having fuel delivery means for delivering a variable quantity of fuel thereto, said power delivery system being controlled by command means for commanding a desired power delivery system performance, the control system comprising:
   actual system performance measuring means for measuring the actual performance of the power delivery system;
   ratio control means operatively coupled to said command means and said actual system performance measuring means for controlling the ratio of said transmission as a function of the desired system performance commanded by said command means and the measured actual system performance, the speed of said prime mover varying as a function of transmission ratio;
   fuel function means defining a desired fuel requirement for said prime mover in relation to prime mover operating speed;
   speed measuring means for measuring the speed of said prime mover; and
   fuel control means operatively coupled to said fuel function means and said fuel delivery means for controlling said fuel delivery means only in accordance with the fuel requirement defined by said fuel function means, so that the fuel delivered to said prime mover is determined only by the speed thereof.

23. A power delivery system comprising:
   a prime mover;
   a continuously variable ratio transmission coupled to said prime mover;
   an output shaft coupled to said transmission for receiving power from said prime mover through said transmission;
   fuel delivery means for delivering a variable quantity of fuel to said prime mover;
   command means for commanding a desired power delivery system performance;
   actual system performance measuring means for measuring the actual performance of the power delivery system;
   ratio control means operatively coupled to said command means and said actual system performance measuring means for controlling the ratio of said transmission as a function of the desired system performance commanded by said command means and the measured actual system performance, the speed of said prime mover varying as a function of transmission ratio;
   fuel function means defining a desired fuel requirement for said prime mover in relation to prime mover operating speed;
   speed measuring means for measuring the speed of said prime mover; and
   fuel control means operatively coupled to said fuel function means and said fuel delivery means for controlling said fuel delivery means only in accordance with the fuel requirement defined by said fuel function means, so that the fuel delivered to said prime mover is determined only by the speed thereof.

24. The system of claim 22 or 23 wherein said ratio control means changes the ratio of said transmission at a rate which is proportional to the difference between the desired system performance and the actual measured system performance.

25. The system of claim 22 or 23 wherein the desired system performance commanded by said command means is desired output power or torque delivered to said output shaft, and the actual measured system performance is actual measured torque delivered to said output shaft.

26. The system of claim 25 wherein said ratio control means changes the ratio of said transmission at a rate which is proportional to the difference between the power or torque commanded by said command means and said measured output torque.

27. The system of claim 25 further comprising overspeed prevention means operatively coupled to said speed measuring means and to said ratio control means for decreasing the ratio of said transmission to increase the load on said prime mover if the measured speed of the prime mover exceeds a predetermined maximum operating speed.

28. The system of claim 25 further comprising underspeed prevention means operatively coupled to said speed measuring means and to said ratio control means for increasing the ratio of said transmission to decrease the load on said prime mover if the measured speed of the prime mover falls below a predetermined minimum permissible operating speed.

29. The system of claim 25 wherein said prime mover is the engine of an engine-driven vehicle, further comprising sensitivity adjusting means operatively coupled to said command means for decreasing the sensitivity of said command means during relatively fast vehicle operation.

30. The system of claim 29 further comprising:
output shaft speed measuring means;
ratio signal generating means operatively coupled to said speed measuring means and to said output shaft speed measuring means for generating a ratio signal equal to the quotient of measured engine speed and measuring output shaft speed;
said sensitivity adjusting means being operatively coupled to said ratio signal generating means to compare said ratio signal to a predetermined fast operation ratio and to modify the output torque commanded by said command means by the inverse of the measured output shaft speed when said ratio signal falls below said fast operation ratio, so that said power delivery system responds to commanded power during relatively fast vehicle operation, and responds to commanded torque during slower vehicle operation.

31. The system of claim 29 further comprising output shaft speed measuring means, said sensitivity adjusting means being operatively coupled to said output shaft speed measuring means to compare said measured output shaft speed to a predetermined fast operation threshold value and to modify the output torque commanded by said command means by the inverse of the measured output shaft speed when said measured output shaft speed exceeds said fast operation threshold value, so that said power delivery system responds to commanded power during relatively fast vehicle operation, and responds to commanded torque during slower vehicle operation.

32. The system of claim 25 wherein said fuel function means defines the prime mover ideal operating line for low fuel consumption.

33. The system of claim 25 wherein said prime mover is an internal combustion engine.

34. The system of claim 33 wherein said fuel delivery means comprises a throttle.

35. The system of claim 25 wherein said prime mover is the engine of an engine-driven vehicle.

36. The system of claim 35 wherein said fuel delivery means comprises a throttle.

37. The system of claim 35 further comprising temporary coupling means for operatively coupling said command means to the fuel delivery means during stationary and relatively slow vehicle operation.

38. The system of claim 37 further comprising means for measuring the speed of said output shaft, said temporary coupling means comprising:
ratio signal generating means for generating a ratio signal equal to the quotient of measured engine speed and measured output shaft speed;
ratio comparing means coupled to said ratio signal generating means for comparing said ratio signal to a predetermined slow operation ratio; and
fuel coupling means for operatively coupling said command means to said fuel delivery means when said ratio signal exceeds said slow operation ratio.

39. The system of claim 37 wherein said engine and said transmission are coupled by a clutch which is disengaged when said vehicle is stationary and is partially engaged during slow vehicle operation, said temporary coupling means diminishing the output torque commanded by said command means in proportion to engine speed, so that excessive clutch slippage is prevented.

40. The system of claim 37 wherein said engine and said transmission are coupled by a clutch, and further comprising:
means for measuring the speed of said output shaft;
ratio signal generating means for generating a ratio signal equal to the quotient of measured engine speed and measured output shaft speed;
ratio comparing means coupled to said ratio signal generating means for comparing said ratio signal to a predetermined slow operation ratio; and
clutch coupling means operatively connected to said ratio comparing means for operatively coupling said command means to said clutch when said ratio exceeds said slow operation ratio, so that said clutch is disengaged when said vehicle is stationary and is partially engaged during slow vehicle operation.

41. The system of claim 35 further comprising command fuel diminishing means for diminishing fuel flow to said fuel delivery means when the power or torque commanded by said command means falls below a predetermined minimum value.

42. The system of claim 41 wherein said command fuel diminishing means comprises:
a command comparing means for comparing the desired output power or torque commanded by said command means with said predetermined minimum value; and
a fuel diminishing valve coupled to said command comparing means, for diminishing fuel delivery to said fuel delivery means when the desired output torque falls below said predetermined minimum value.

43. The system of claim 41 further comprising speed fuel suspension means for suspending fuel flow to said fuel delivery means when the speed of said engine exceeds a predetermined maximum permissible value.

44. The system of claim 43 wherein said speed fuel suspension means comprises:
speed comparing means for comparing the speed of said engine with said predetermined maximum permissible value; and
a fuel suspension mechanism coupled to said speed comparing means, to prevent fuel delivery to said fuel delivery means when the speed of said engine exceeds said predetermined maximum permissible value.

45. The system of claim 25 wherein the transmission provides substantially all ratios required to maintain constant output shaft speed for any normally encountered load while said fuel delivery means is controlled only in accordance with said fuel function.

46. A method of controlling the operation of the engine of an engine-driven vehicle having fuel delivery means for delivering a variable quantity of fuel thereto, said engine coupled to a continuously variable drive ratio transmission for delivering power from said engine to an output shaft, said vehicle having command means for commanding a desired output power or torque delivered to said output shaft, the drive ratio of said transmission varying as a function of commanded power or torque to thereby cause the speed of said engine to vary, the method comprising the steps of:

predetermining a fuel function defining desired fuel requirement for said engine in relation to engine operating speed;

measuring the speed of said engine;

controlling said fuel delivery means only in accordance with said fuel function so that the fuel delivered to said engine is determined only by the speed thereof; and operatively coupling said command means to said fuel delivery means during stationary and relatively slow vehicle operation.

47. The method of claim 46 wherein the step of operatively coupling said command means to said fuel delivery means comprises:

measuring the speed of said output shaft;

generating a ratio signal equal to the quotient of measured engine speed and measured output shaft speed;

comparing said ratio signal to a predetermined slow operation ratio; and operatively coupling said command means to said fuel delivery means when said ratio signal exceeds said slow operation ratio.

48. The method of claim 46 wherein said engine and said transmission are coupled by a clutch which is disengaged when said vehicle is stationary and is partially engaged during slow vehicle operation, wherein the output torque commanded by said command means is diminished in proportion to engine speed so that excessive clutch slippage is prevented.

49. The method of claim 46 wherein said engine and said transmission are coupled by a clutch, the method further comprising the steps of:

measuring the speed of said output shaft;

generating a ratio signal equal to the quotient of measured engine speed and measured output shaft speed;

comparing said ratio signal to a predetermined slow operation ratio; and operatively coupling said command means to said clutch when said ratio exceeds said slow operation ratio, so that said clutch is disengaged when said vehicle is stationary, and is partially engaged during slow vehicle operation.

50. The method of claim 46 further comprising the step of diminishing fuel flow to said fuel delivery means when the power or torque commanded by said command means falls below a predetermined minimum value.

51. The method of claim 47 further comprising the step of suspending fuel flow to said fuel delivery means when the speed of said engine exceeds a predetermined maximum permissible value.

52. The method of claim 46 wherein said fuel function is the engine ideal operating line for low fuel consumption.

53. The method of claim 46 wherein said engine is an internal combustion engine.

54. The method of claim 46 wherein said fuel delivery means comprises a throttle.

55. The method of claim 46 wherein the transmission provides substantially all ratios required to maintain constant vehicle speed for any normally encountered load while said fuel delivery means is controlled only in accordance with said fuel function.

56. A system for controlling the operation of the engine of an engine-driven vehicle having fuel delivery means for delivering a variable quantity of fuel thereto, said engine coupled to a continuously variable drive ratio transmission for delivering power from said engine to an output shaft, said vehicle having command means for commanding a desired output power or torque delivered to said output shaft, the drive ratio of said transmission varying as a function of commanded power or torque to thereby cause the speed of said engine to vary, the system comprising:

fuel function means defining a desired fuel requirement for said engine in relation to prime mover operating speed;

speed measuring means for measuring the speed of said engine;

fuel control means operatively coupled to said fuel function means and said fuel delivery means for controlling said fuel delivery means only in accordance with the fuel requirement defined by said fuel function means, so that the fuel delivered to said engine is determined only by the speed thereof; and temporary coupling means for operatively coupling said command means to the fuel delivery means during stationary and relatively slow vehicle operation.

57. The system of claim 56 further comprising means for measuring the speed of said output shaft, said temporary coupling means comprising:

ratio signal generating means for generating a ratio signal equal to the quotient of measured engine speed and measured output shaft speed;

ratio comparing means coupled to said ratio signal generating means for comparing said ratio signal to a predetermined slow operation ratio; and fuel coupling means for operatively coupling said command means to said fuel delivery means when said ratio signal exceeds said slow operation ratio.

58. The system of claim 56 wherein said engine and said transmission are coupled by a clutch which is disengaged when said vehicle is stationary and is partially engaged during slow vehicle operation, said temporary coupling means diminishing the output torque commanded by said command means in proportion to engine speed, so that excessive clutch slippage is prevented.

59. The system of claim 56 wherein said engine and said transmission are coupled by clutch, and further comprising:

means for measuring the speed of said output shaft;

ratio signal generating means for generating a ratio signal equal to the quotient of measured engine speed and measured output shaft speed;

ratio comparing means coupled to said ratio signal generating means for comparing said ratio signal to a predetermined slow operation ratio; and clutch coupling means operatively connected to said ratio comparing means for operatively coupling said command means to said clutch when said ratio exceeds said slow operation ratio, so that said clutch is disengaged when said vehicle is stationary and is partially engaged during slow vehicle operation.

60. The system of claim 56 further comprising command fuel diminishing means for diminishing fuel flow to said fuel delivery means when the power or torque commanded by said command means falls below a predetermined minimum value.

61. The system of claim 60 wherein said command fuel diminishing means comprises:

a command comparing means for comparing the desired output power or torque commanded by said command means with said predetermined minimum value; and a fuel diminishing valve coupled to said command comparing means, for diminishing fuel delivery to said fuel delivery means when the desired output power or torque falls below said predetermined minimum value.

62. The system of claim 60 further comprising speed fuel suspension means for suspending fuel flow to said fuel delivery means when the speed of said engine exceeds a predetermined maximum permissible value.

63. The system of claim 62 wherein said speed fuel suspension means comprises:

speed comparing means for comparing the speed of said engine with said predetermined maximum permissible value; and a fuel suspension mechanism, coupled to said speed comparing means, to prevent fuel delivery to said fuel delivery means when the speed of said engine exceeds said predetermined maximum permissible value.

64. The system of claim 56 wherein said fuel function is the engine ideal operating line for fuel consumption.

65. The system of claim 56 wherein said engine is an internal combustion engine.

66. The system of claim 56 wherein said fuel delivery means comprises a throttle.

67. The system of claim 56 wherein the transmission provides substantially all ratios required to maintain constant vehicle speed for any normally encountered load while said fuel delivery means is controlled only in accordance with said fuel function.

* * * * *